US006180257B1

(12) United States Patent
Brandt et al.

(10) Patent No.: US 6,180,257 B1
(45) Date of Patent: *Jan. 30, 2001

(54) COMPRESSION MOLDING OF SYNTHETIC WOOD MATERIAL

(75) Inventors: Jeffrey R. Brandt, Blacklick; Burch E. Zehner, Gahanna, both of OH (US)

(73) Assignee: Crane Plastics Company Limited Partnership, Columbus, OH (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/739,416

(22) Filed: Oct. 29, 1996

(51) Int. Cl.⁷ ..................................................... B32B 23/04

(52) U.S. Cl. ....................... 428/532; 428/536; 264/219; 264/319; 264/328.17; 264/330; 264/331.11

(58) Field of Search .................................. 428/532, 536; 264/319, 328.17, 331.11, 219, 330

(56) References Cited

U.S. PATENT DOCUMENTS

| | | |
|---|---|---|
| 2,188,396 | 1/1940 | Semon .................................. 18/55 |
| 2,489,373 | 11/1949 | Gilman ................................ 260/37 |
| 2,519,442 | 8/1950 | Delorme et al. .................... 260/37 |
| 2,558,378 | 6/1951 | Petry .................................. 260/41 |
| 2,635,976 | 4/1953 | Meiler et al. ..................... 154/132 |
| 2,680,102 | 6/1954 | Becher .............................. 260/17.3 |
| 2,789,903 | 4/1957 | Lukman et al. ..................... 92/21 |
| 2,935,763 | 5/1960 | Newman et al. ..................... 18/55 |
| 3,287,480 | 11/1966 | Wechsler et al. ................. 264/122 |
| 3,308,218 | 3/1967 | Wiegand et al. .................. 264/121 |
| 3,309,444 | 3/1967 | Schueler ............................ 264/109 |
| 3,492,388 | 1/1970 | Inglin-Knüsel .................... 264/129 |
| 3,493,527 | 2/1970 | Schueler ........................... 260/17.2 |

(List continued on next page.)

FOREIGN PATENT DOCUMENTS

| | | |
|---|---|---|
| 2042176 | 4/1971 | (DE) . |
| 44033/73 | 9/1973 | (DE) . |
| 3801574 | 1/1988 | (DE) . |
| 40 33 849 A1 | 10/1990 | (DE) . |
| 42 21 070 A1 | 12/1993 | (DE) . |
| 0 269 470 A2 | 1/1988 | (EP) . |
| 93306843 | 8/1993 | (EP) . |
| 93306844 | 8/1993 | (EP) . |
| 93306845 | 8/1993 | (EP) . |
| 74 06548 | 2/1974 | (FR) . |
| 76 28288 | 9/1976 | (FR) . |
| 79 10288 | 4/1979 | (FR) . |
| 84 07466 | 5/1984 | (FR) . |
| 82 23635 | 8/1982 | (GB) . |
| 86 04589 | 2/1986 | (GB) . |
| 87 02959 | 2/1987 | (GB) . |
| PCT/SE90/00014 | 1/1990 | (WO) . |

OTHER PUBLICATIONS

Bibliography of Solid Phase Extrusion, pp. 187–195, 1984.

Dalväg et al., The Efficiency of Cellulosic Fillers in Common Thermoplastics. Part II. Filling with Processing Aids and Coupling Agents, 1985, vol. 11, pp. 9–38.

Fiberloc Polymer Composites, B.F. Goodrich, Geon Vinyl Division, section 1, pp. 2–15, 1985.

Henrici–Olivé et al., "Integral/Structural Polymer Foams: Technology, Properties and Applications" Springer–Verlag, Berlin, pp. 111–112, 1983.

(List continued on next page.)

Primary Examiner—Leszek Kiliman
(74) Attorney, Agent, or Firm—Standley & Gilcrest LLP

(57) ABSTRACT

A system of compression molding a synthetic wood formulation into a commercially useable synthetic wood component is described. Surprising results are achieved when the dry formulation is placed under heat and pressure. Many different components may be made using the present invention, such as by example, wood-like trim components for the housing construction industry.

13 Claims, 2 Drawing Sheets

U.S. PATENT DOCUMENTS

| | | | |
|---|---|---|---|
| 3,562,373 | 2/1971 | Logrippo | 264/118 |
| 3,645,939 | 2/1972 | Gaylord | 260/17.4 GC |
| 3,671,615 | 6/1972 | Price | 264/39 |
| 3,864,201 | 2/1975 | Susuki et al. | 161/160 |
| 3,867,493 | 2/1975 | Seki | 264/45.9 |
| 3,878,143 | 4/1975 | Baumann et al. | 260/17.4 R |
| 3,879,505 | 4/1975 | Boutillier et al. | 264/48 |
| 3,888,810 | 6/1975 | Shinomura | 260/17.4 BB |
| 3,899,559 | 8/1975 | Johnanson et al. | 264/115 |
| 3,922,328 | 11/1975 | Johnson | 264/46.1 |
| 3,931,384 | 1/1976 | Forquer et al. | 264/120 |
| 3,943,079 | 3/1976 | Hamed | 260/17.4 BB |
| 3,954,555 | 5/1976 | Kole et al. | 162/136 |
| 3,956,541 | 5/1976 | Pringle | 428/2 |
| 3,956,555 | 5/1976 | McKean | 428/106 |
| 3,969,459 | 7/1976 | Fremont et al. | 264/109 |
| 4,005,162 | 1/1977 | Bucking | 264/25 |
| 4,012,348 | 3/1977 | Chelland et al. | 260/28.5 R |
| 4,016,232 | 4/1977 | Pringle | 264/112 |
| 4,016,233 | 4/1977 | Pringle | 264/122 |
| 4,018,722 | 4/1977 | Baker | 260/2.3 |
| 4,029,831 | 6/1977 | Daunheimer | 427/264 |
| 4,045,603 | 8/1977 | Smith | 428/2 |
| 4,056,591 | 11/1977 | Goettler et al. | 264/108 |
| 4,058,580 | 11/1977 | Flanders | 264/113 |
| 4,071,479 | 1/1978 | Broyde et al. | 260/2.3 |
| 4,071,494 | 1/1978 | Gaylord | 260/42.14 |
| 4,097,648 | 6/1978 | Pringle | 428/326 |
| 4,102,106 | 7/1978 | Golder et al. | 52/533 |
| 4,107,110 | 8/1978 | Lachowicz et al. | 260/17.4 CL |
| 4,115,497 | 9/1978 | Halmø et al. | 264/115 |
| 4,145,389 | 3/1979 | Smith | 264/40.7 |
| 4,157,415 | 6/1979 | Lindenberg | 428/284 |
| 4,168,251 | 9/1979 | Schinzel et al. | 260/17.4 R |
| 4,178,411 | 12/1979 | Cole et al. | 428/310 |
| 4,181,764 | 1/1980 | Totten | 428/155 |
| 4,187,352 | 2/1980 | Klobbie | 521/79 |
| 4,191,798 | 3/1980 | Schumacher et al. | 428/95 |
| 4,203,876 | 5/1980 | Dereppe et al. | 260/17.4 R |
| 4,228,116 | 10/1980 | Colombo et al. | 264/119 |
| 4,239,679 | 12/1980 | Rolls et al. | 260/42.49 |
| 4,241,133 | 12/1980 | Lund et al. | 428/326 |
| 4,244,903 | 1/1981 | Schnause | 264/68 |
| 4,248,743 | 2/1981 | Goettler | 260/17.4 BB |
| 4,248,820 | 2/1981 | Haataja | 264/113 |
| 4,250,222 | 2/1981 | Mavel et al. | 428/285 |
| 4,263,184 | 4/1981 | Leo et al. | 260/17.4 CL |
| 4,263,196 | 4/1981 | Schumacher et al. | 260/33.6 |
| 4,272,577 | 6/1981 | Lyng | 428/112 |
| 4,273,688 | 6/1981 | Porzel et al. | 260/17.4 R |
| 4,277,428 | 7/1981 | Luck et al. | 264/118 |
| 4,290,988 | 9/1981 | Nopper et al. | 264/112 |
| 4,303,019 | 12/1981 | Haataja et al. | 108/51.1 |
| 4,305,901 | 12/1981 | Prince et al. | 264/176 R |
| 4,317,765 | 3/1982 | Gaylord | 523/204 |
| 4,323,625 | 4/1982 | Coran et al. | 428/361 |
| 4,376,144 | 3/1983 | Goettler | 428/36 |
| 4,382,108 | 5/1983 | Carroll et al. | 428/326 |
| 4,382,758 | 5/1983 | Nopper et al. | 425/82.1 |
| 4,393,020 | 7/1983 | Li et al. | 264/108 |
| 4,414,267 | 11/1983 | Coran et al. | 428/288 |
| 4,420,351 | 12/1983 | Lussi et al. | 156/62.4 |
| 4,430,468 | 2/1984 | Schumacher | 524/109 |
| 4,440,708 | 4/1984 | Haataja et al. | 264/109 |
| 4,480,061 | 10/1984 | Coughlin et al. | 524/13 |
| 4,491,553 | 1/1985 | Yamada et al. | 264/51 |
| 4,503,115 | 3/1985 | Hemels et al. | 428/281 |
| 4,505,869 | 3/1985 | Nishibori | 264/115 |
| 4,506,037 | 3/1985 | Suzuki et al. | 521/82 |
| 4,508,595 | 4/1985 | Gåsland | 162/158 |
| 4,562,218 | 12/1985 | Fornadel et al. | 524/15 |
| 4,594,372 | 6/1986 | Natov et al. | 523/208 |
| 4,597,928 | 7/1986 | Terentiev et al. | 264/87 |
| 4,610,900 | 9/1986 | Nishibori | 428/15 |
| 4,645,631 | 2/1987 | Hegenstaller et al. | 264/69 |
| 4,659,754 | 4/1987 | Edwards et al. | 523/214 |
| 4,663,225 | 5/1987 | Farley et al. | 428/290 |
| 4,687,793 | 8/1987 | Motegi et al. | 523/200 |
| 4,717,742 | 1/1988 | Beshay | 523/203 |
| 4,734,236 | 3/1988 | Davis | 264/112 |
| 4,737,532 | 4/1988 | Fujita et al. | 524/13 |
| 4,769,109 | 9/1988 | Tellvik et al. | 162/123 |
| 4,769,274 | 9/1988 | Tellvik et al. | 428/218 |
| 4,783,493 | 11/1988 | Motegi et al. | 524/13 |
| 4,789,604 | 12/1988 | van der Hoeven | 428/503 |
| 4,790,966 | 12/1988 | Sandberg et al. | 264/39 |
| 4,791,020 | 12/1988 | Kokta | 428/326 |
| 4,801,495 | 1/1989 | van der Hoeven | 428/286 |
| 4,818,604 | 4/1989 | Tock | 428/319.9 |
| 4,820,749 | 4/1989 | Beshay | 523/203 |
| 4,851,458 | 7/1989 | Hopperdietzel | 523/205 |
| 4,865,788 | 9/1989 | Davis | 264/112 |
| 4,889,673 | 12/1989 | Takimoto | 264/118 |
| 4,894,192 | 1/1990 | Warych | 264/68 |
| 4,915,764 | 4/1990 | Miani | 156/244.19 |
| 4,927,572 | 5/1990 | van der Hoeven | 264/22 |
| 4,927,579 | 5/1990 | Moore | 264/101 |
| 4,935,182 | 6/1990 | Ehner et al. | 264/112 |
| 4,960,548 | 10/1990 | Ikeda et al. | 264/40.4 |
| 4,968,463 | 11/1990 | Levasseur | 264/40.1 |
| 4,973,440 | 11/1990 | Tamura et al. | 264/114 |
| 4,978,489 | 12/1990 | Radvan et al. | 264/118 |
| 4,988,478 | 1/1991 | Held | 264/518 |
| 5,002,713 | 3/1991 | Palardy et al. | 264/109 |
| 5,008,310 | 4/1991 | Beshay | 524/13 |
| 5,009,586 | 4/1991 | Pallmann | 425/311 |
| 5,049,334 | 9/1991 | Bach | 264/122 |
| 5,057,167 | 10/1991 | Gersbeck | 156/62.2 |
| 5,064,592 | 11/1991 | Ueda et al. | 264/112 |
| 5,075,057 | 12/1991 | Hoedl | 264/115 |
| 5,075,359 | 12/1991 | Castagna et al. | 524/13 |
| 5,078,937 | 1/1992 | Eela | 264/109 |
| 5,082,605 | 1/1992 | Brooks et al. | 264/40.6 |
| 5,087,400 | 2/1992 | Theuveny | 264/115 |
| 5,088,910 | 2/1992 | Goforth et al. | 425/142 |
| 5,096,046 | 3/1992 | Goforth et al. | 198/604 |
| 5,096,406 | 3/1992 | Brooks et al. | 425/205 |
| 5,120,776 | 6/1992 | Raj et al. | 524/13 |
| 5,153,241 | 10/1992 | Beshay | 524/8 |
| 5,194,461 | 3/1993 | Bergquist et al. | 524/13 |
| 5,219,634 | 6/1993 | Aufderhaar | 428/156 |
| 5,272,000 | 12/1993 | Chenoweth et al. | 428/283 |
| 5,276,082 | 1/1994 | Forry et al. | 524/504 |
| 5,288,772 | 2/1994 | Hon | 524/35 |
| 5,302,634 | 4/1994 | Mushovic | 523/219 |
| 5,369,147 | 11/1994 | Mushovic | 523/219 |
| 5,406,768 | 4/1995 | Giuseppe et al. | 52/730.4 |
| 5,422,170 | 6/1995 | Iwata et al. | 428/218 |
| 5,435,954 | 7/1995 | Wold | 264/115 |
| 5,474,722 | 12/1995 | Woodhams | 264/45.3 |
| 5,480,602 | 1/1996 | Nagaich | 264/122 |
| 5,486,553 | 1/1996 | Deaner et al. | 524/13 |
| 5,497,594 | 3/1996 | Giuseppe et al. | 52/730.4 |
| 5,516,472 | * 5/1996 | Laver | 264/118 |
| 5,518,677 | 5/1996 | Deaner et al. | 264/142 |
| 5,532,065 | 7/1996 | Gübitz | 428/480 |
| 5,537,789 | 7/1996 | Minke et al. | 52/313 |
| 5,539,027 | 7/1996 | Deaner et al. | 524/13 |
| 5,576,374 | 11/1996 | Betso et al. | 524/451 |
| 5,585,155 | 12/1996 | Heikklia et al. | 428/36 |
| 5,593,625 | 1/1997 | Riebel et al. | 264/115 |

OTHER PUBLICATIONS

Klason et al., The Efficiency of Cellulosic Fillers in Common Thermoplastics. Part I. Filling without Processing Aids or Coupling Agents, Polymeric Materials, 1984, vol. 10, pp. 159–187.

Kokta et al., Composites of Poly(Vinyl Chloride) and Wood Fibers. Part II: Effect of Chemical Treatment, Polymer Composites, Apr. 1990, pp. 84–89.

Kokta et al., Composites of Polyvinyl Chloride–Wood Fibers. I. Effect of Isocyanate as a Bonding Agent, Polym.–Plast. Technol. Eng., 1990, 29(1&2), pp. 87–118.

Kokta et al., Composites of Polyvinyl Chloride–Wood Fibers. III: Effect of Silane as Coupling Agent, Journal of Vinyl Technology, Sep. 1990, pp. 146–153.

Kokta et al., Use of Grafted Wood Fibers in Thermoplastic Composites v. Polystyrene, Centre de recherche en pâtes et papiers, Université du Québec à Trois–Rivières, Canada, 1982.

Kokta et al., Use of Wood Fibers in Thermoplastic Composites, Polymer Composites, Oct. 1983, pp. 229–232.

Maldas et al., Composites of Polyvinyl Chloride–Wood Fibers: IV. Effect of the Nature of Fibers, Journal of Vinyl Technology, Jun. 1989, pp. 90–98.

Myers et al., Bibliography: Composites from Plastics and Wood–Based Fillers, USDA Forest Products Laboratory, Madison, WI, pp. 1–27 odds (1991).

Myers et al., Effects of Composition and Polypropylene Melt Flow on Polypropylene–Waste Newspaper Composites, ANTEC, 1984, pp. 602–604.

Myers et al., "Wood flour and polypropylene or high–density polyethylene composites: influence of maleated polypropylene concentration and extrusion temperature on properties", "Wood Fiber–Polymer Composites: Fundamental Concepts, Processes, and Material Options ", pp. 49–56, 1983.

Raj et al., Use of Wood Fiber as Filler in Common Thermoplastics: Studies on Mechanical Properties, Science and Engineering of Composite Materials, vol. 1 No. 3, 1989, pp. 85–98.

Raj et al., Use of Wood Fibers in Thermoplastics. VII. The Effect of Coupling Agents in Polyethylene–Wood Fiber Composites, Journal of Applied Polymer Science, vol. 37, pp. 1089–1103 (1989).

Rogalski et al., Poly(Vinyl–Chloride) Wood Fiber Composites, ANTEC, 1987, pp. 1436–1441.

Sonwood: a new PVC wood–flour alloy for Extrusions and other Plastic Processing Techniques, Sonesson Plast AB, Malmo, Sweden, 1986.

Sonwood Outline, Apr., 1975.

Thomas et al., Wood Fibers for Reinforcing Fillers for Polyolefins, ANTEC, 1984, pp. 687–689.

Woodhams et al., Wood Fibers for Reinforcing Fillers for Polyolefins, Polymer Engineering and Science, Oct. 1984, pp. 1166–1171.

Yam et al., Composites from Compounding Wood Fibers With Recycled High Density Polyethylene, Polymer Engineering and Science, mid–Jun. 1990, pp. 693–699.

Zadorecki et al., Future Prospects for Wood Cellulose as Reinforcement In Organic Polymer Composites, Polymer Composites, Apr. 1989, pp. 69–77.

Pornnimit et al., Extrusion of Self–Reinforced Polyethylene, Advances in Polymer Technology, vol.11, No. 2, pp. 92–98.

Bendtsen et al., Mechanical Properties of Wood, pp. 4–2 to 4–44, 1986.

Brzoskowski et al., Air–Lubricated Die for Extrusion of Rubber Compounds, Rubber Chemistry and Technology, vol. 60, pp. 945–956, 1985.

Collier et al., High Strength Extrudates by Melt Transformation Coextrusion, ANTEC, 1987, pp. 497–502.

Collier et al., Streamlined Dies and Profile Extursion, ANTEC, 1987, pp. 203–206.

Techno Material, Techno Material Co., Ltd., 1988.

* cited by examiner

COMPRESSION MOLDING OF SYNTHETIC WOOD MATERIAL

BACKGROUND AND SUMMARY OF THE INVENTION

The present invention relates generally to wood replacement materials. In particular, the present invention relates to a wood-polymer composite material suitable for use in place of natural wood. The present invention describes a process for manufacturing the composite materials.

For several reasons, there is a need to find materials that exhibit the look and feel of natural wood. One reason has to do with the supply of good wood for construction purposes from the world's forest. This supply of wood from mature trees has become an important issue in recent years and as a result the cost of wood has risen.

Several attempts have been made by others to find a wood like material. Many of these efforts have failed due to the qualities of the resultant product.

In addition to natural wood, other materials such as particle board, wafer board, and the like may be replaced by the synthetic wood of the present invention. One noticeable improvement over these materials is that synthetic wood has enhanced moisture resistance.

The present invention overcomes many of the disadvantages of the prior art attempts at a quality wood replacement material that is capable of being produced in a commercially practicable production environment. The present invention includes the combining of cellulosic material with a thermoplastic material and optionally with a cross-linking agent to form a combined product.

In the present invention conventional compression molding equipment is used to fuse the combined product under sufficient conditions to blend the combined product into a homogeneous mixture and a completed useable synthetic wood material component.

In a preferred material composition of the present invention, the synthetic wood material includes approximately two-thirds organic fibrous or cellulosic material and approximately one-third thermoplastic material in combination. The resultant product has an appearance similar to wood and may be sawed, sanded, shaped, turned, fastened and/or finished in the same manner as natural wood. The resultant product is resistant to rot and decay as well as termite attack. The resultant product may be used for example as, decorative moldings inside or outside of a house, picture frames, furniture, porch decks, window moldings, window components, door components, roofing systems, and any other type of use where structural requirements do not exceed the physical properties of the resultant material.

More particularly, in a preferred embodiment of the present invention, it is useful in conjunction with the synthetic wood composition and method as described in U.S. Pat. No. 15 5,516,472 which issued on May 14, 1996, entitled EXTRUDED SYNTHETIC WOOD COMPOSITION AND METHOD FOR MAKING SAME.

DETAILED DESCRIPTION OF PREFERRED EMBODIMENT(S)

The present invention is directed toward synthetic wood compositions of the type in which synthetic wood material composites are compression molded.

The cellulosic fibrous-polymer composite material used in the present invention may have a higher cellulosic fiber content then normally recognized. The overall process may include the mixing of raw materials including cellulosic fibers, thermoplastic materials, cross-linking agents and process lubricants. The cellulosic material may be any one or more cellulosic materials such as sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo or palm fiber, and kenaf Cellulosic material is first dried to a low moisture content. Although apparently not critical a preferred moisture content is about 1%–10%.

Thermoplastic materials may include multilayer films, polyethylene, polypropylene, polyvinyl chloride (PVC), low density polyethylene (LDPE), ethyl-vinyl acetate, other polyethylene copolymers and other thermoplastics.

Examples of cross-linking agents include polyurethanes, such as isocynate, phenolic resins, unsaturated polyesters and epoxy resins and combinations of the same. Lubricants may be added as a process aid. Examples of lubricants include zinc stearate or wax. Other materials may be added which are known to the art and include accelerators, inhibitors, enhancers, compatibilizers and blowing agents.

Two example formulation recipes are described below:

|  | Amount (parts per total) |
|---|---|
| Recipe A | |
| Wood Flour (40/mesh maple) | 250 |
| Polyethylene (HDPE) | 100 |
| Zinc Stearate | 7.5 |
| External Wax | 5 |
| Phenolic Resin | 15 |
| Isocyanate (MDI) | 2.5 |
| Recipe B | |
| Wood Flour (40/mesh maple) | 250 |
| PVC | 100 |
| Lubricant (ester) | 3 |
| External Wax | 4 |
| Process Aids (acrylic) | 4 |
| Calcium Stearate | 2 |
| Tin Stabilizer | 2 |

Figure 1:
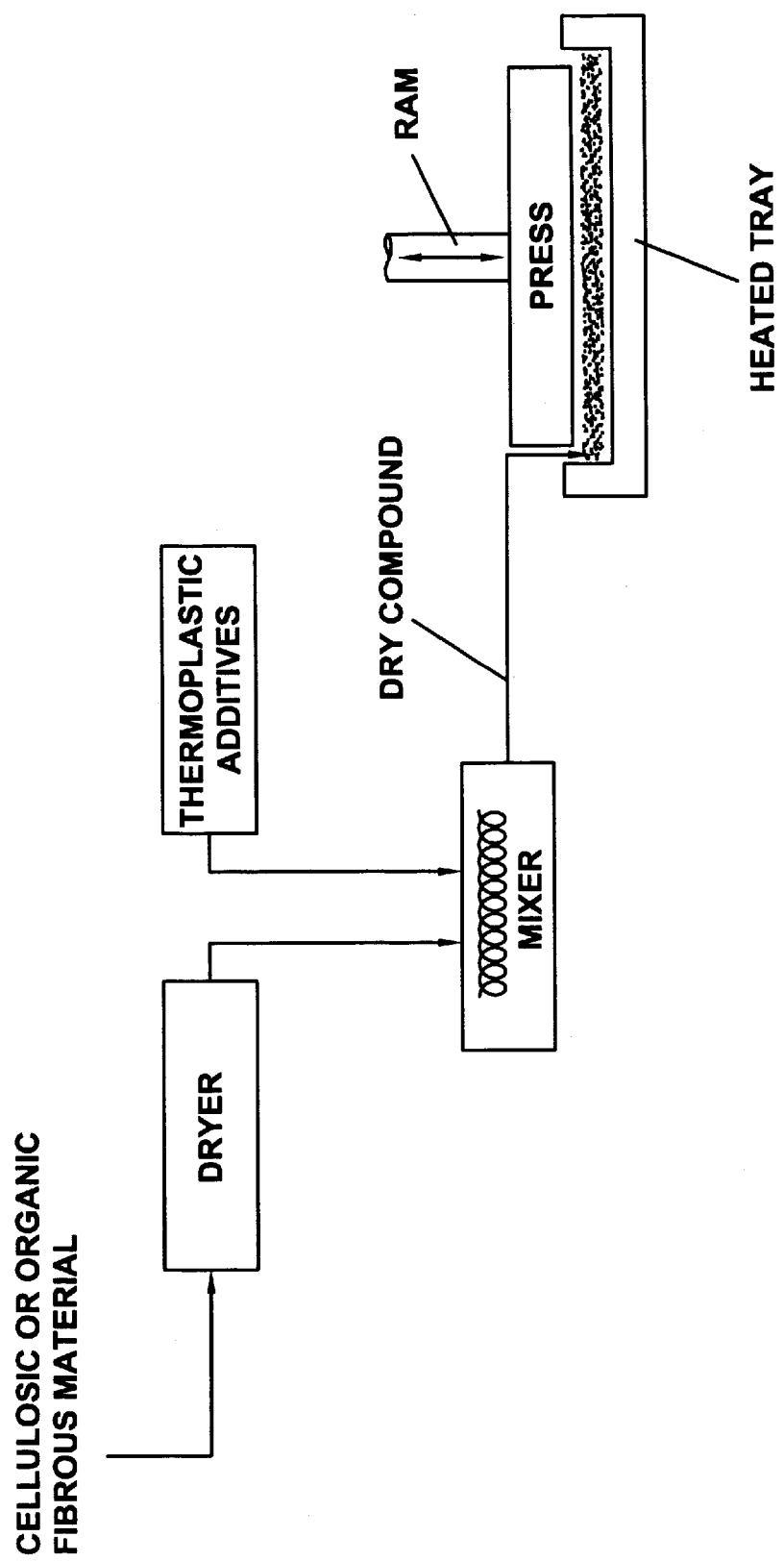
FIG. 1 is a schematic diagram illustrating the process of the present invention.

In the preferred embodiment of the present invention, as shown in FIG. 1, the cellulosic fiber, thermoplastic raw materials, and other minor ingredients are physically mixed or blended by any simple or conventional mixing or blending device. The preferred process temperature at the compression mold is about 350° F. Several well known compression molding machines may be used in the present invention.

Figure 2:
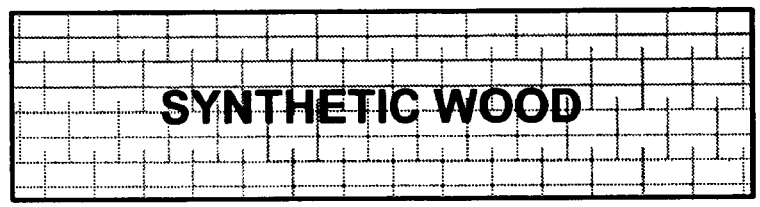
FIG. 2 is a schematic representation of a first embodiment of a resultant product of the present invention.

The composition achieved surprising results when it was compression molded to form flat boards or other three dimensional shapes. The powder blended composition was placed in a compression mold under heat and pressure to form a three dimensional shaped article as shown in FIG. 2.

The compression molding device into which the composition is loaded includes one or more mold cavities, a hydraulic press, temperature controls, and cooling features.

Figure 3:
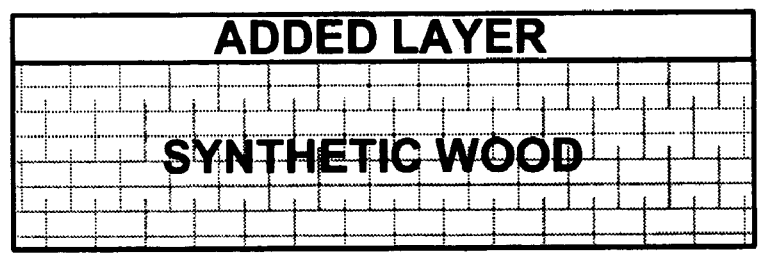
FIG. 3 is a schematic representation of a second embodiment of a resultant product of the present invention.

As shown in FIG. 3, an optional film or sheet layer may be added to adhere to the wood composite material to provide a different aesthetic and functional surface appearance. The compatible films or sheets may include such weatherable polymer films as PVC, CPVC, S-RPVC, fluoropolymer, acrylic, and acrylic-fluoropolymer alloys appropriately selected to match compatibility with the substrate wood-like composite material. These films may naturally adhere to the compression molded composite substrate when compressed onto the substrate while in the compression mold under the temperature and pressure provided by the compression mold process, or they may be later secured to the substrate by using adhesives or compatibilizers such as EVA, EMA, and caprolactone for example.

EXAMPLE

48"×120" synthetic wood boards were compression molded on a 4000 ton Dominion slab-sided Hydraulic press which was manufactured around 1955. The platen dimensions of the press were 3"×62"×148".

The loose material was loaded by weight into a ¾" sheet mold which was lined with a ¾" thick wooden frame. The height of the frame was between 2 to 2.375 inches. The area inside the wooden frame was 50"×124".

The material was loaded in the mold and distributed evenly (leveled) in the mold by the use of a straight bar which is indexed equally off the sides of the mold so as to provide an even distribution.

A flat aluminum plate (lid) was placed on top of the synthetic wood material and the mold was loaded into an unheated press.

The press was closed to a line pressure of 700 PSI, and the operating temperature was set at 350° F.

The molds were heated for (1) hour and (5) minutes including the heat-up time. (Heat-up time would be approximately 25 minutes.) After the heat cycle, the press was cooled for approximately one hour and the sheets were done.

Below is a summary of some pertinent facts:

Inside dimension of mold: ¾"×51.5"×125.5"

Mold dimension inside wooden frame: 50"×124"

Weight loaded: 203 lbs. per mold

Height of wooden frame: Approximately 2"

Height of leveled pile before processing: 2.7"

Compressed thickness of finished sheet: 0.903"–0.911"

Total length of heat cycle including 25 minute heat-up period: 1 hour—5 minutes.

Processing temperature: 350° F.

Internal temperature of the material at the end of the heat cycle: 330° F.

Processing pressure: 700 PSI line pressure for the entire heat and cool phase of the cycle.

Processing pressure on the work (specific pressure): 355 PSI

Length of cool cycle: Approximately 1 hour.

Press used: Dominion. 4000 ton slab-sided hydraulic press. Manufacture approximately 1955.

Platen size: 3"×62"×148"

Bulk density of the loose material was: 21 lbs./ft.$_3$

Density of the finished product was: 62.4 lbs./ft.$_3$

The above described advantages and features of the present invention are offered as an example of the way in which the present invention may be commercially implemented. The embodiments listed herein are, therefore, exemplary in nature and are not intended to unnecessarily limit the scope of the following claims.

What is claimed is:

1. A method of manufacturing an article, said method comprising:

drying at least one cellulosic material to a desired moisture content;

mixing said at least one cellulosic material with at least one thermoplastic material and optional additives to form a composition, said composition comprised of 50% to 70% by weight of said at least one cellulosic material, 20% to 40% by weight of said at least one thermoplastic material, and 0% to 30% by weight of said additives; and compression molding said composition to form said article.

2. The method of claim 1 wherein said compression molding is performed at a line pressure of about 700 pounds per square inch.

3. The method of claim 2 wherein said compression molding includes a heating phase.

4. The method of claim 3 wherein said compression molding is performed during said heating phase at a temperature of about 350 degrees Fahrenheit after an initial heat-up period.

5. The method of claim 3 wherein said heating phase lasts about 65 minutes.

6. The method of claim 3 wherein said compression molding includes a cooling phase that follows said heating phase.

7. The method of claim 6 wherein said cooling phase lasts about 60 minutes.

8. The method of claim 1 wherein said compression molding includes a heating phase.

9. The method of claim 8 wherein said compression molding is performed during said heating phase at a temperature of about 350 degrees Fahrenheit after an initial heat-up period.

10. The method of claim 8 wherein said heating phase lasts about 65 minutes.

11. The method of claim 8 wherein said compression molding includes a cooling phase that follows said heating phase.

12. The method of claim 11 wherein said cooling phase lasts about 60 minutes.

13. The method of claim 1 wherein said additives are selected from the group consisting of cross-linking agents, lubricants, accelerators, inhibitors, enhancers, compatibilizers, and blowing agents.

* * * * *